United States Patent [19]

Harada et al.

[11] Patent Number: 4,762,196

[45] Date of Patent: Aug. 9, 1988

[54] VEHICLE SLIP CONTROL APPARATUS

[75] Inventors: Yasuhiro Harada; Kazutoshi Nobumoto; Eizi Nishimura; Toru Onaka; Mitsuru Nagaoka; Toshihiro Matsuoka, all of Hiroshima, Japan

[73] Assignee: Mazda Motor Corporation, Hiroshima, Japan

[21] Appl. No.: 74,783

[22] Filed: Jul. 17, 1987

[30] Foreign Application Priority Data

Jul. 24, 1986 [JP] Japan .................................. 61-172698
Jul. 24, 1986 [JP] Japan .................................. 61-172703

[51] Int. Cl.$^4$ ............................................. B60K 31/00
[52] U.S. Cl. ..................................... 180/197; 303/106; 364/426
[58] Field of Search .................. 180/197; 303/106, 96, 303/116, 119; 364/426

[56] References Cited

U.S. PATENT DOCUMENTS 4,484,280 11/1984 Brugger et al. ..................... 180/197
4,583,611 4/1986 Frank et al. ......................... 180/197
4,637,487 1/1987 Nakamura et al. ................. 180/197

Primary Examiner—John A. Pekar
Attorney, Agent, or Firm—Wegner & Bretschneider

[57] ABSTRACT

The vehicle slip control apparatus is designed so as to enable the slip control to be done by causing the output torque of the engine to be reduced and operating the brake when an amount of a slip or spinning of the driving wheels is large, on the one hand, and only by causing the output torque of the engine to be reduced without using the brake when an amount of the slip or spinning of the driving wheels is small.

20 Claims, 15 Drawing Sheets

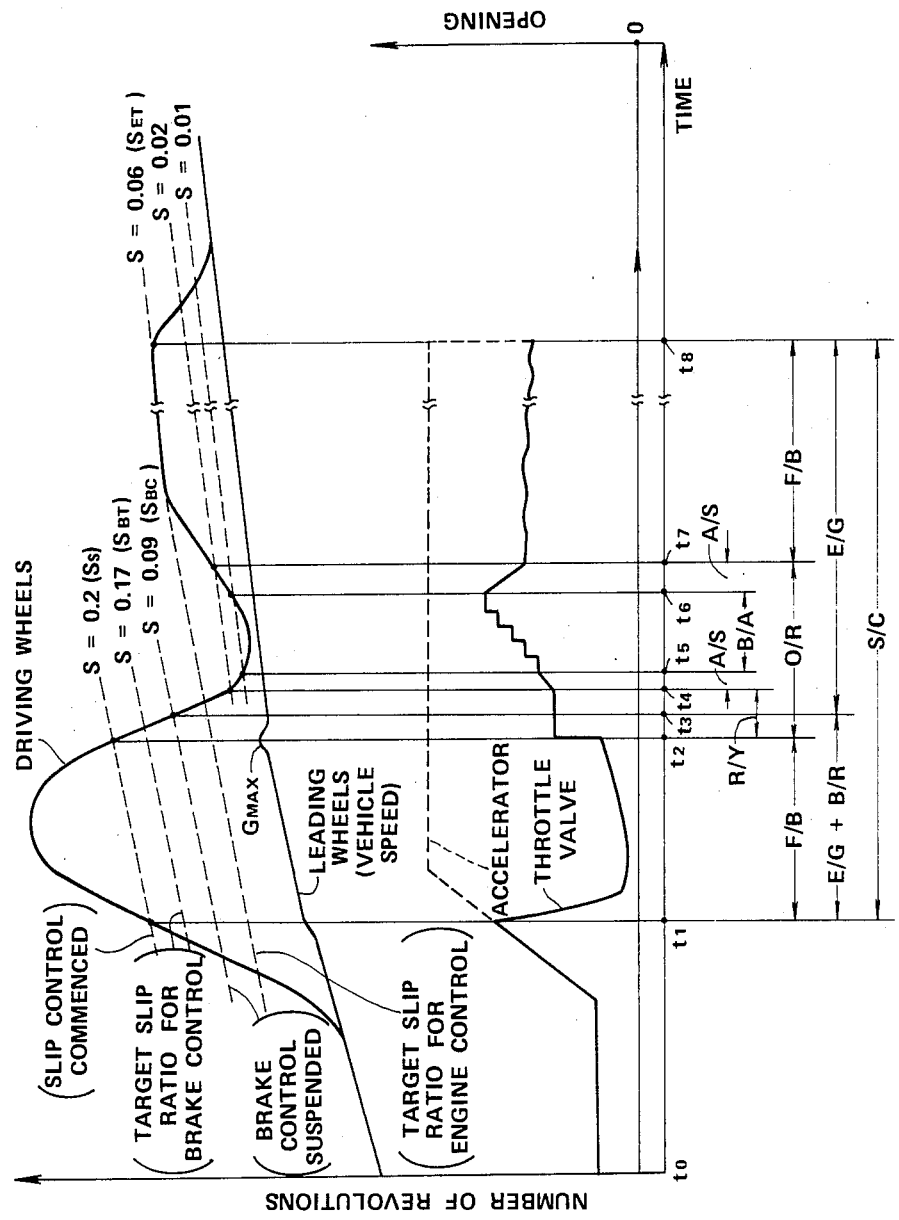

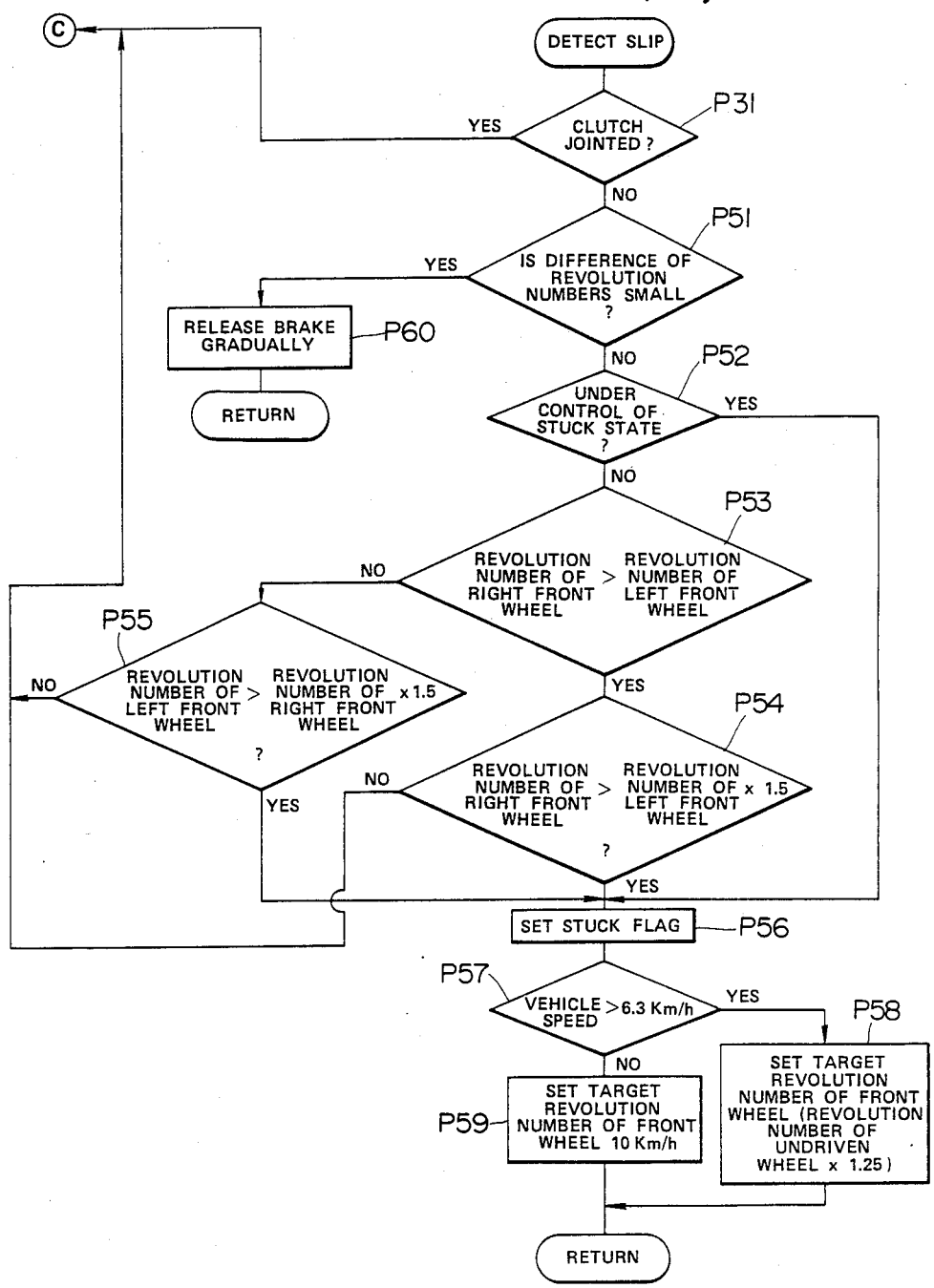

4,762,196

VEHICLE SLIP CONTROL APPARATUS

FIELD OF THE INVENTION

The present invention relates to a vehicle slip control apparatus and, more particularly, to a slip control apparatus of a vehicle designed capable of preventing the driving (driven) wheels from slipping or being spinned excessively on a road surface by controlling a torque transmitted to the driving wheels.

BACKGROUND OF THE INVENTION

Prevention of the driving wheels from an excessive slip or spinning on a road surface is extremely useful for the sake of safety as well as for an effective provision with the driving force of a vehicle. The prevention may be achieved by decreasing a torque to be transmitted to the driving wheels—a torque being the cause of the slip or spinning.

Slip control systems of this type are disclosed in Japanese Patent Early Publication (Laid-Open) No. 16,948/1983 (corresponding to U.S. Pat. No 4,484,280) and Japanese Patent Early Publication (Laid-Open) No. 56,662/1985 (corresponding to U.S. Pat. No. 4,583,611). The systems disclosed in these two prior applications involve, in each case, a technique using the application of a braking force by the engine to the driving wheels and a reduction in the output torque of the engine itself in order to decrease the torque to be transmitted to the driving wheels. More specifically, Japanese Patent Early Publication No. 16,948/1983 discloses a system in which the braking of the driving wheels only is carried out when a slip of the driving wheels is small, on the one hand, and the output torque of the engine is caused to be decreased, in addition to the braking of the driving wheels, when the slip of the driving wheels becomes large, on the other hand. Japanese Patent Early Publication No. 56,662/1985 discloses a system in which, when a slip of only one side of the left and right driving wheels is larger than that of the other side thereof, the one side thereof alone is braked and, when slips of both the left and right driving wheels are large, the both sides of the driving wheels are braked and further the output torque by the engine is caused to be reduced. The prior art systems as disclosed in the above patent applications are such that the braking of the driving wheels by the brake is primarily utilized and the reduction in the output torque of the engine is secondarily utilized.

Since the prior art systems are mainly the brake for the slip control for the driving wheels as described immediately above, they have various disadvantages that follow.

As the brake is continuously employed for the slip control, and is likely to be abused, it is disadvantageous in terms of durability.

As the brake is connected to the driving wheels to an extent greater than the engine, the use of the brake is advantageous in terms of a response to the slip control by the brake; however, the use of the brake is likely to cause a shock in the course of driving, leading to rendering the driving feeling poor. When the slip control is elaborately conducted mainly using the brake, consideration should be given to the driving feeling, whereby a braking apparatus should be rendered more complex and larger than conventional ones.

The use of the brake causes the engine to output a surplus of the torque equivalent to the braking force so that it is disadvantageous in terms of an effective use of energy leading to fuel saving.

SUMMARY OF THE INVENTION

The present invention has the object to provide a vehicle slip control apparatus capable of conducting the slip control of the driving wheels by selecting the appropriate use of the braking force applied to the driving wheels and a decreasing amount of the output torque of a power source itself, such as the engine, leading to a reduction in a frequency of the use of the brake.

In order to achieve the above object, the slip control apparatus in accordance with the present invention is designed so as mainly to decrease the output torque of a power source and supplementarily to use the brake in order to reduce the slip or spinning of the driving wheels. More specifically, the slip control is carried out by reducing the output torque of a power source without braking the driving wheels, when an amount of slip of spinning of the driving wheel is small, on the one hand, and by braking the driving wheel, in addition to the use of the output torque of the power source reduced, when an amount of slip or spinning is large, on the other hand, as shown more specifically as a block diagram in FIG. 21.

The present invention provides the slip control apparatus designed so as to prevent an amount of the slip or spinning of the driven wheel against a road surface from becoming excessively by controlling the torque transmitted to the driven wheel, which comprises output torque adjusting means for adjusting the output torque of a power source functioning a source of the output of the torque, braking force adjusting means for adjusting a braking force of the brake for a driving wheel, slip detecting means for detecting a state of a slip or spinning of the driving wheel on a road surface, and slip controlling means for carrying out the slip control by controlling said output torque adjusting means and said braking force adjusting means in response to an output from said slip detecting means, thereby reducing the output torque of said power source without using a braking force of the driving wheel when an amount of slip or spinning of the driving wheel is small, and thereby providing the driving wheel with the braking force, in addition to the reduction in the output torque of the power source, when an amount of slip or spinning of the driving wheel is large.

The slip control apparatus with the arrangement in accordance with the present invention causes the brake to be used with low frequency and consequently avoids the excessive use of the brake, thereby leading to a reduction in the occurrence of an undesirable shock accompanied by the use of the brake and a decrease in the output of useless torques.

When an amount of the slip or spinning is large, of course, the slip control is conducted by reducing the output torque of a power source as well as applying the braking force by the braking to the driving wheels, thereby lessening the large amount of the slip or spinning within short time.

Other objects and advantages of the present invention will become apparent from the course of the following description by way of embodiments.

BRIEF DESCRIPTION OF THE DRAWINGS

FIG. 5 is a diagramatical graph illustrating a control example in accordance with the present invention.

DETAILED DESCRIPTION OF THE PREFERRED EMBODIMENTS

Brief Description on Overall Construction

Figure 1:
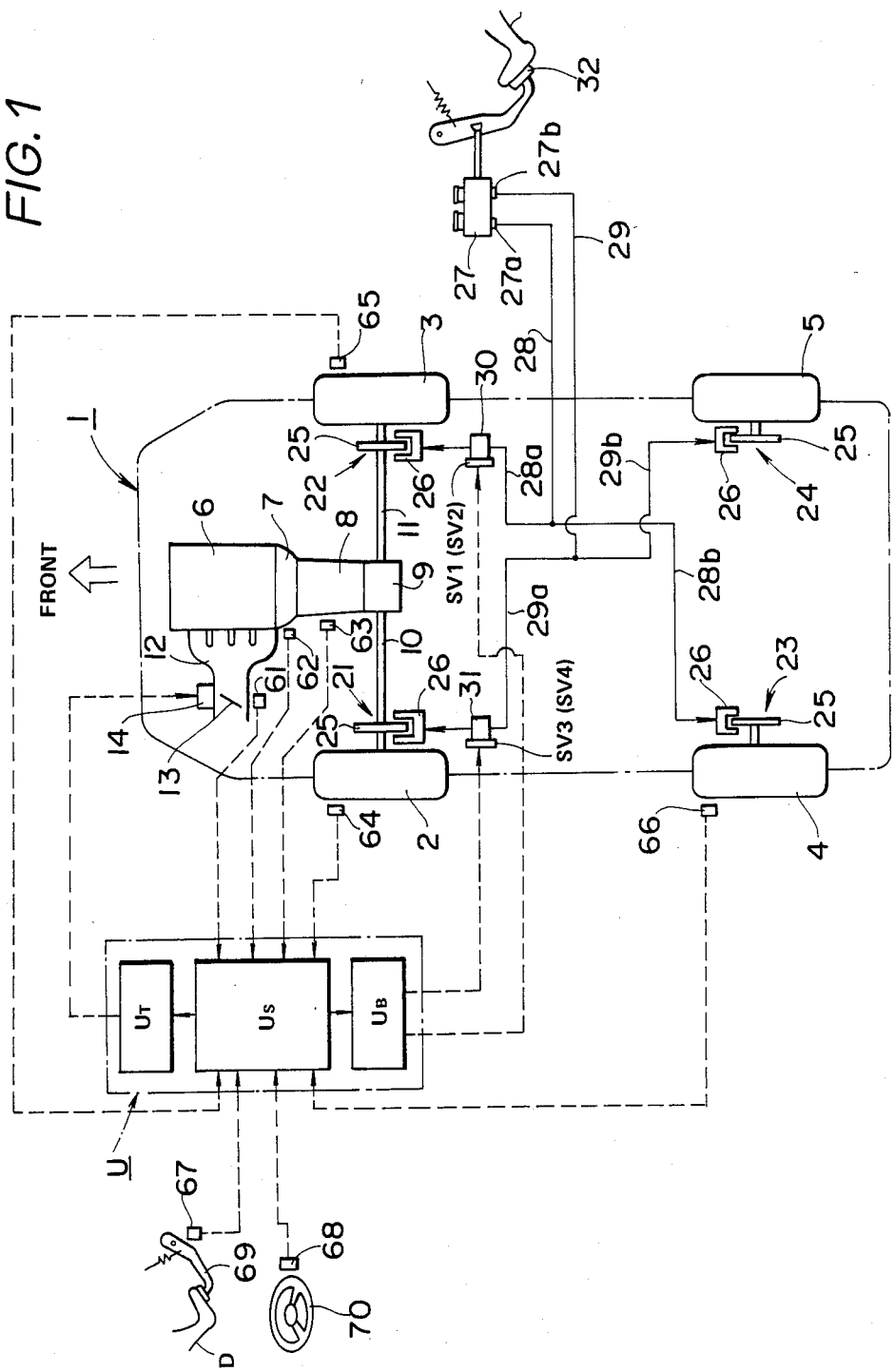
FIG. 1 is an overall schematic diagram illustrating an embodiment according to the present invention.

In FIG. 1, an automobile 1 contains a left front wheel 2 and a right front wheel 3, which function as driving (driven) wheels, and a left rear wheel 4 and a right rear wheel 5, which function as leading (undriven) wheels. In the front of the automobile 1 is mounted an engine 6 as a power source, which generates torques that are transmitted to a clutch 7, a transmission 8 and a differential gear 9 and then through a left drive shaft 10 and a right drive shaft 11 to the respective left and right front wheels 2 and 3 as the driving wheels. In this embodiment, the automobile 1 used is of the FF (front-engine/-front-drive) type.

In this embodiment, the engine 6 used as the power source is shown to carry out the load control, that is, the control of the torques generated, by a throttle valve 13 mounted on an air intake passage 12. More specifically, the engine 6 is a gasoline engine of the type that the torques generated are varied with an amount of intake air. The control of the intake air amount may be conducted by the throttle valve 13, and the throttle valve 13 is electromagnetically opened or closed by a throttle actuator 14. The throttle actuator 14 may be composed of, for example, a DC motor, stepping motor or any appropriate means that may be electromagnetically controlled by fluid pressures such as hydraulic pressures.

The wheels 2 to 5 are provided, respectively, with a brake 21, 22, 23 and 24, each of which may be a disk brake. The disk brake is provided with a disk 25 rotating with the respective wheels and a caliper 26 that holds a brake pad and is provided with a wheel cylinder. The caliper 26 is designed so as to generate a braking force by pressing the brake pad on the disk 25 in accordance with a magnitude of the brake pressure to be supplied on the wheel cylinder.

A master cylinder 27 functioning as a source of generating the brake pressure may be of the tandem type having two discharging openings 27a and 27b. A braking pipe 28, on the one hand, extends from the discharging openings 27a and it is branched along the line into branch pipes 28a and 28b, the branch pipe 28a being connected to the brake 22, more specifically, to the wheel cylinder thereof, for the right front wheel and the branch pipe 28b being connected to the brake 23 for the left rear wheel. A braking pipe 29, on the other, extends from the discharging openings 27b and it is branched along the line into branch pipes 29a and 29b, the branch pipe 29a being connected to the brake 21 for the left front wheel and the branch pipe 29b being connected to the brake 24 for the right rear wheel. As described hereinabove, the braking pipe system may be of a so-called 2-system X type. To the branch pipes 28a and 29a for the respective brakes 21 and 22 of the front wheels functioning as the driving wheels are connected, respectively, hydraulic pressure control valves 30 and 31 of the electromagnetic type as means for controlling a braking force. It is noted as a matter of course that the brake pressures generating on the master cylinder 27 is of the type that varies with pressures generating by a brake pedal 32 applied by the force stepped by an operator D.

Brake Pressure Regulating Circuit

Figure 2:
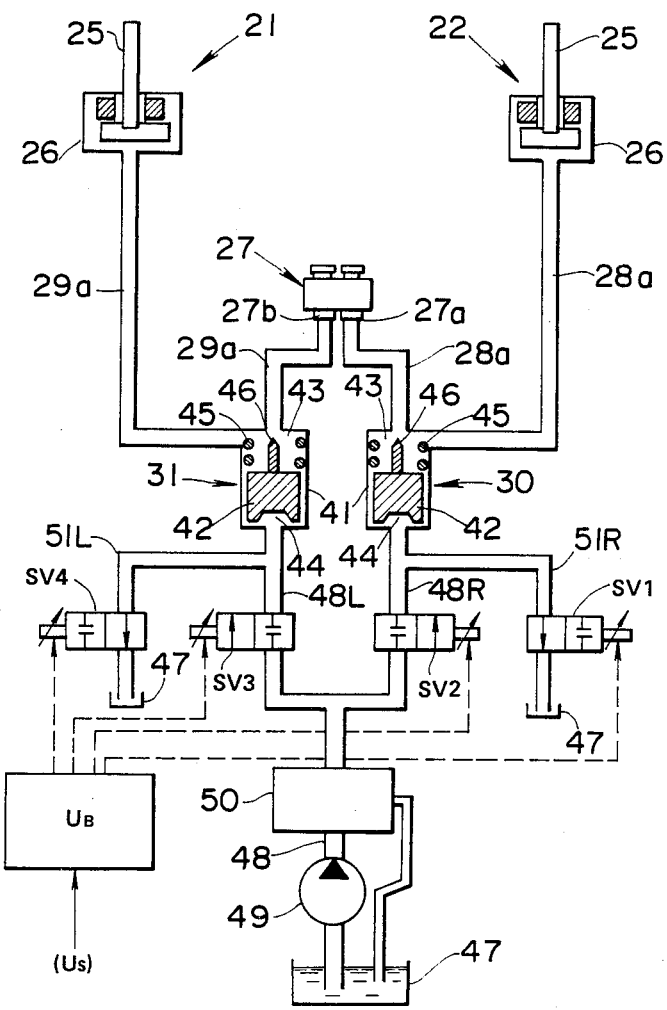
FIG. 2 is a diagram illustrating a hydraulic brake control circuit.

As shown specifically in FIG. 2, each of the control valves 30 and 31 are provided with a cylinder 41 and a piston 42 inserted slidably in the cylinder 41. The piston 42 divides the cylinder 41 into a volume-variable chamber 43 and a control chamber 44. The volume-variable chamber 43 works as a passage of the brake pressure against the brakes 21 and 22 from the master cylinder 27. Accordingly, the brake pressure is caused to generate against the brakes 21 and 22 as the volume of the volume-variable chamber 43 is varied in accordance with an adjustment of a displacement position of the piston 42 and the brake pressure generated is allowed to be increased, decreased or retained.

The piston 42 is caused to be always actuated by a return spring 45 in the direction so as to cause the volume in the volume-variable chamber 43 to be enlarged. The piston 42 is integrated with a check valve 46. When the piston 42 is caused to displace in the direction causing the volume in the volume-variable chamber 43 to be decreased, an inlet to the volume-variable chamber 43 is closed whereby the brake pressure generated by the volume-variable chamber 43 works merely on the brake 21 and 22 and do not act on the brakes 23 and 24 for the rear wheels 4 and 5 functioning as the leading wheels.

The adjustment of the displacement position of the piston 42 is carried out by adjusting the regulation of the hydraulic pressure against the control chamber 44. More specifically, a supply pipe 48 extending from a reservoir 47 is branched along the line into two branch pipes 48R and 48L, one branch pipe 48R being connected to the control chamber 44 of the valve 30 and the other branch pipe 48L being connected to the control chamber 44 of the valve 31. To the supply pipe 48 are connected a pump 49 and a relief valve 50. To the branch pipes 48R and 48L are connected, respectively, supply valves SV2 and SV3 consisting each of an electromagnetically switching (open-close) valve. Each of the control valves 44 is additionally connected to the reservoir 47 through discharge pipes 51R and 51L, the discharge pipe 51R being connected with a discharge valve SV1 consisting of an electromagnetically switching valve and the discharge pipe 51L being connected with a discharge valve SV 4 consisting of an electromagnetically switching valve.

When the braking is effected using each of the hydraulic pressure regulating valves 30 and 31, that is, when the slip control is conducted, a brake does not effectively work basically by way of operation of the brake pedal 32 due to an action of the check valve 46. When the brake pressure to be generated by the hydraulic pressure regulating valve 30 or 31 is small, for example, when the pressure is decreased, the brake works by way operation of the brake pedal 32. Of course, when no brake pressure for the slip control is generated by the hydraulic pressure regulating valve 30 or 31, a usual braking action arising from operation of the brake pedal 32 works because the master cylinder 27 is caused to communicate with the brake 21 or 22.

Each of the valves SV1 to SV4, inclusive, is controlled by opening or closing by way of a brake control unit $U_B$ as will be described more in detail below. A table below demonstrates relationships of a state of the brake pressure against the brakes 21 and 22 with operation of each of the valves SV1 to SV4, inclusive.

| | | VALVES | | | |
|---|---|---|---|---|---|
| | | SV 1 | SV 2 | SV 3 | SV 4 |
| BRAKE 21 | Increase Pressure | — | — | Opened | Closed |
| | Decrease Pressure | — | — | Closed | Opened |
| | Retain Pressure | — | — | Closed | Closed |
| BRAKE 22 | Increase Pressure | Closed | Opened | — | — |
| | Decrease Pressure | Opened | Closed | — | — |
| | Retain Pressure | Closed | Closed | — | — |

Brief Constructions of Control Units

Referring to FIG. 1, reference symbol U denotes generally a control unit group consisting roughly of a throttle control unit $U_T$ and a slip control unit $U_S$ as well as a brake control unit $U_B$. The brake control unit $U_B$ is designed so as to control the opening or closing of each of the valves SV1 to SV4, inclusive, as have been described above, on the basis of signals output from the slip control unit $U_S$. The throttle control unit $U_T$ is to control the driving of the throttle actuator 14 on the basis of signals output from the slip control unit $U_S$.

The slip control unit $U_S$ comprises a computer of the degital type, more specifically, a microcomputer. The slip control unit $U_S$ is provided with signals output from each of sensors or switches 61 to 68, inclusive. The sensor 61 is to detect a degree of the opening of the throttle valve 13. The sensor 62 is to detect whether or not the clutch 7 is jointed. The sensor 63 is to detect the number of speeds of the transmission 8. The sensors 64 and 65 are, respectively, to detect the numbers of revolutions of the lefthand and righthand front wheels 2 and 3 as the driving wheels. The sensor 66 is to detect the number of revolutions of the rear wheel 4 as the leading wheel, that is, a vehicle speed. The sensor 67 is to detect an amount of operation of an accelerator 69, that is, an opening of the accelerator. The sensor 68 is to detect an amount of operation of a steering wheel 70, that is, a steering angle. Each of the sensors 64, 65 and 66 is composed using, for example, a pick-up and each of the sensors 61, 63, 67 and 68 is composed using, for example, a potentiometer. The sensor 62 comprises, for example, an on/off operating switch.

The slip control unit $U_S$ is provided basically with a CPU, a ROM, a RAM, a CLOCK and an output/input interface as well as an A/D converter or a D/A converter in accordance with input signals or output signals. This is the same when a microcomputer is employed so that detailed description thereon will be omitted herein. A description on maps, however, will be made herein by referring to those memorized in a ROM of the control unit $U_S$.

The following is a description on the control manner of the control unit group U. A slip ratio S used therefor may be defined by the following relationship (1):

$$S = \frac{W_D - W_L}{W_D} \quad (1)$$

where
$W_D$ is the number of revolutions of the driving wheels (2 and 3) and
$W_L$ is the number of revolutions of the leading wheel (4), that is, the vehicle speed.

Throttle Control

Figure 12:
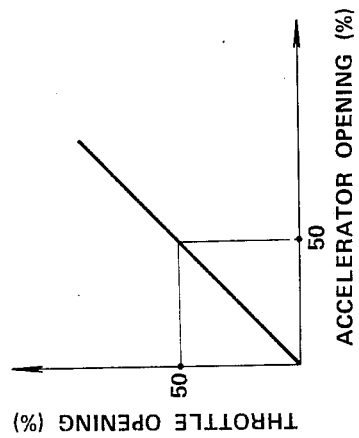
FIG. 12 is a graph illustrating the character of the throttle opening with respect to the accelerator opening when no slip control is conducted.

The throttle control unit $U_T$ is designed to conduct the feedback control of the throttle valve 13 (or the throttle actuator 14) so as to become a target throttle opening. When no slip control is conducted during the throttle control, the target throttle opening is regulated so as to be proportional by a 1-to-1 ratio to the amount of operation of the accelerator 69 by an operator D. FIG. 12 shows one example of the relationship of the throttle opening with the accelerator opening. The throttle control unit $U_T$ is also designed so as to carry out the throttle control to become a target throttle opening Tn integrated by the slip control unit $U_S$, upon the slip control, without following the characteristic demonstrated in FIG. 12.

The feedback control of the throttle valve 13 using the throttle control unit $U_T$ is designed in this embodiment to be carried out by way of the PI-PD control so as to compensate for a variation in response speeds of the engine 6. That is, the opening of the throttle valve 13 is regulated by way of the PI-PD control to coincide the present slip ratio with the target slip ratio during the slip control of the driving wheels. More specifically, the target throttle opening Tn during the slip control can be given by the following relationship (2):

$$T_n = T_{n-1} + K_I \times \left( \frac{W_{Ln}}{1 - S_{ET}} - W_{Dn} \right) + \quad (2)$$

$$K_P \times \left( \frac{W_{Ln} - W_{Ln-1}}{1 - S_{ET}} - W_{Dn} + W_{Dn-1} \right) -$$

$$F_P(W_{Dn} - W_{Dn-1}) - F_D(W_{Dn-2} \times W_{Dn-1} + W_{Dn-2})$$

where
- $W_L$ is the number of revolutions of the leading wheel (4);
- $W_D$ is the number of revolutions of the driving wheels (2 and 3);
- $K_P$ is a proportional coefficient;
- $K_I$ is an integral coefficient;
- $F_P$ is a proportional coefficient;
- $F_D$ is a differential coefficient; and
- $S_{ET}$ is a target slip ratio for the throttle control.

As given by the above relationship (2), the numbers of revolutions of the driving wheels are regulated by way of the feedback control so as to cause the throttle opening Tn to become a predetermined target slip ratio $S_{ET}$. In other words, as is apparent from the above relationship (1), the throttle opening is regulated so as for the target revolution numbers of the driven wheels, $W_{ET}$, to have the following relationship (3):

$$W_{ET} = \frac{W_L}{1 - S_{ET}} \quad (3)$$

Figure 3:
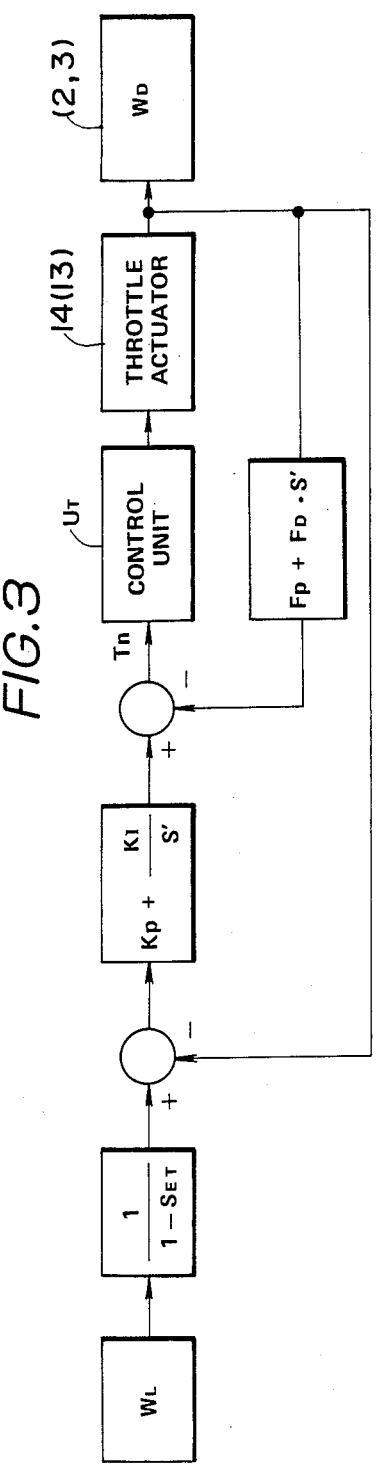
FIG. 3 is a block diagram illustrating a feedback control of a throttle valve.

In FIG. 3, the PI-PD control using the throttle control unit $U_T$ as described above is indicated as a block diagram, in which reference symbol "S'" denotes an operator and suffixes "n" and "n−1" denote, respectively, values of signals at the present sampling time and at the sampling time by one previous to the present sampling time.

Brake Control

At the time of the slip control, the feedback control is effected using the brake control unit $U_B$ such that the spinning of the left and right driving wheels 2 and 3, respectively, is caused to become a predetermined target slip ratio $S_{BT}$ independently and separately from each other. In other words, the brake control is conducted by way of the feedback control such that the revolution number of the driving wheels $W_{BT}$ is determined by the following relationship (4):

$$W_{BT} = \frac{W_L}{1 - S_{BT}} \quad (4)$$

In this embodiment, the target slip ratio $S_{BT}$ by the brake is determined to a degree larger than the target slip ratio $S_{ET}$, as will be described below. In other words, the slip control in this embodiment is conducted so as to lessen a frequency of the use of the brake by increasing or decreasing the engine output to become the predetermined target slip ratio $S_{ET}$ for the throttle control or the predetermined target slip ratio $W_{ET}$ and, further, by increasing or decreasing the torques by the brake to cause the target slip ratio $S_{ET}$ or the target slip ratio $W_{ET}$ to become larger than the target brake slip ratio $S_{BT}$ or the revolution number of the driving wheels $W_{BT}$. Further, in this embodiment, the feedback control as satisfying the relationship (4) is carried out by the I-PD control that is superior in stability. More specifically, an amount of the brake operation (an amount of operation of the pistons 44 in the valves 30 and 31) Bn can be given by the following relationship (5):

$$B_n = B_{n-1} + K_I\left(W_{Ln} \times \frac{1}{1 - S_{BT}} - W_{Dn}\right) - \quad (5)$$
$$F_P(W_{Dn} - W_{Dn-1}) - F_D(W_{Dn} - 2 \times W_{Dn-1} + W_{Dn-2})$$

where
- $K_I$ is an integral coefficient,
- $K_D$ is a proportional coefficient, and
- $F_D$ is a differential coefficient.

When the amount of the brake operation Bn is larger than zero, that is, when it is positive, the brake pressure is increased. When the amount of the brake operation Bn is equal to or smaller than zero, that is, when it is negative, the brake pressure is decreased. The increase or decrease in the brake pressure is conducted by opening or closing the valves SV1 to SV4, inclusive, as have been described above. Adjustment of speeds of the increase or decrease in the brake pressure is made by adjusting ratios of the opening time to the closing time (duty ratios) of the valves SV1 to SV4, inclusive, by way of the duty control that is proportional to the absolute value of the brake operation amount Bn given by the relationship (5) above. Accordingly, the absolute value of the brake operation amount Bn becomes proportional to a speed of a variation in the brake pressures, and the duty ratio determining the speed of the increase or decrease in the brake pressures indicates the brake operation amount Bn.

Figure 4:
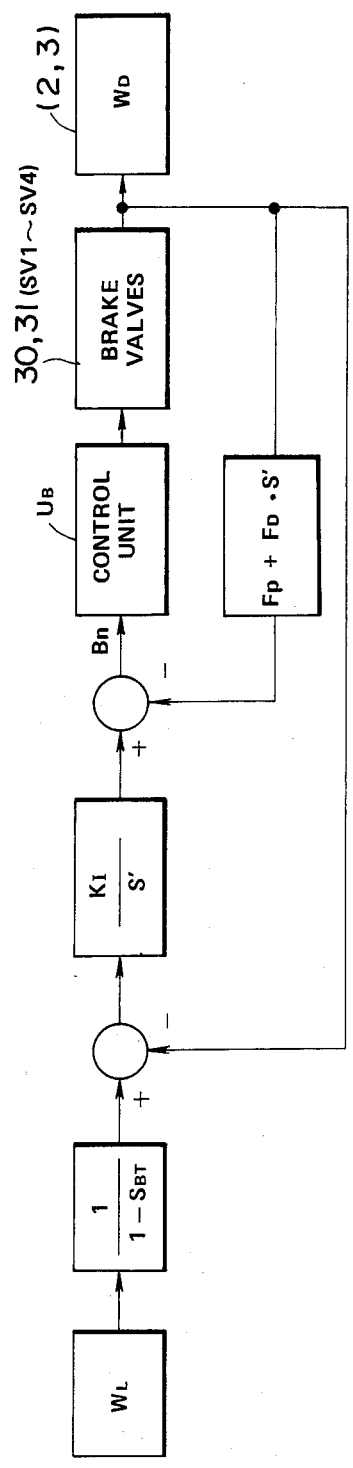
FIG. 4 is a block diagram illustrating a feedback control of a brake.

FIG. 4 indicates the I-PD control using the brake control unit $U_B$, as have been described above, as a block diagram, in which reference symbol "S" denotes an operator.

Brief Description on Overall Slip Control System

An overall system of the slip control will be described herein with reference to FIG. 5 where reference symbols and figures have the following meanings:
- S/C: region of the slip control;
- E/G: slip control by the engine;
- B/R: slip control by the brake;
- F/B: feedback control
- O/R: open loop control
- R/Y: recovery control
- B/A: backup control
- A/S: absorb (shockless) control
- S=0.2: slip ratio at the time of commencement of the slip control ($S_S$)
- S=0.17: target slip ratio by the brake ($S_{BT}$)
- S=0.09: slip ratio at the time of suspension (cancellation) of the slip control by the brake ($S_{BC}$)
- S=0.06: target slip ratio by the engine ($S_{ET}$)
- S=0.01-0.02: slip ratio in the region where the absorb control is effected
- S=≦0.01: slip ratio in the region where the backup control is effected It is to be noted herein that the above figures are based on data obtained by actually driving a vehicle with spike tires on a frozen road surface. Furthermore, it is noted that the figures S=0.01-0.02 in the region where the absorb control is effected and the slip ratio S=0.09 at the time of suspension of the slip control by the brake are set as invariable, respectively, on the one hand, and that the target slip ratio $S_{BT}$ by the brake, the target slip ratio $S_{ET}$ by the engine, and the slip ratio $S_S$ at the time of commencement of the slip control vary with a state of road surfaces, on the other hand. In FIG.

Figure 13:
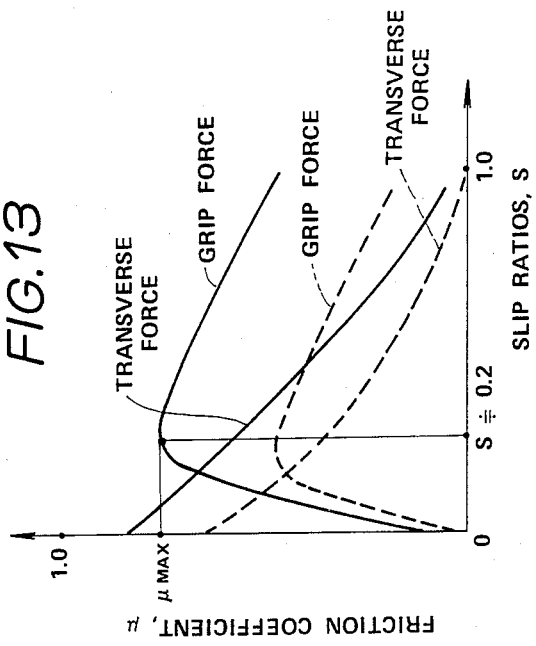
FIG. 13 is a graph showing the relationship of the grip force of the driving wheel with the transverse force thereof and the relationship of slip ratios with road surface friction coefficients.

5, the target slip ratio $S_{BT}$ by the brake, the target slip ratio $S_{ET}$ by the engine, and the slip ratio $S_S$ at the time of commencement of the slip control are set as 0.17, 0.06, and 0.2, respectively, as one example. It is also noted that the figure $S=0.2$ for the slip ratio at the time of commencement of the slip control uses a slip ratio at the time of the occurrence of the maximum grip force to be obtained when the spike tires were employed, as referred to as the solid line in FIG. 13. The reason why the slip ratio at the time of the commencement of the slip control is set as large as $S=0.2$ is so as to enable an actual slip ratio at the time when the maximum grip force is produced to be given. The target slip ratios $S_{BT}$ and $S_{ET}$ by the engine and brake, respectively, are corrected in accordance with the slip ratio at the time of the occurrence of the maximum grip force. In FIG. 13, the solid line demonstrates a variation in the relationship of magnitudes of grip forces and transverse forces, represented as friction coefficients against road surfaces, during the use of spike tires with the corresponding slip ratios and the broken line demonstrates a variation in the relationship of magnitudes of grip and transverse forces, represented as friction coefficients against road surfaces, when normal tires are employed, with the corresponding slip ratios.

Given the above description, FIG. 5 will be described in the course of time.

(1) From $t_0$ to $t_1$:

No slip control is conducted over the course of time from $t_0$ to $t_1$ because the slip ratio S does not exceed $S=0.2$ that is the condition for the commencement of the slip control. In other words, when the spinning of the driving wheels is small, acceleration can be improved without the slip control, thereby enabling the driving utilizing a large grip force. It is a matter of course that, during this period of time, the peculiar character of the throttle opening against the accelerator opening is determined to be constant as demonstrated in FIG. 12.

(2) From $t_1$ to $t_2$:

At this point $t_1$ the slip control is commenced, and the slip ratio is equal to or higher than the point ($S=0.09$) of the suspension of the slip control by the brake. During the course of time, the slip ratio is so relatively large that the slip control is conducted by the decreasing generation of the torques by the engine and by the regulation by the brake. It is also noted that, since the target slip ratio ($S=0.17$) by the brake is higher than the target slip ratio ($S=0.06$) by the engine, brake pressures are applied to the brake when the spinning is large ($S>0.17$), on the one hand, and no brake pressures are applied thereto and the spinning is controlled so as to be reduced by the control of the engine only when the spinning is small ($S<0.17$). A description on the suspension of the slip control by the brake will be made below.

Figure 15:
FIG. 15 is a graph showing the optimum throttle opening corresponding to the maximum acceleration during the recovery control.
Figure 20:
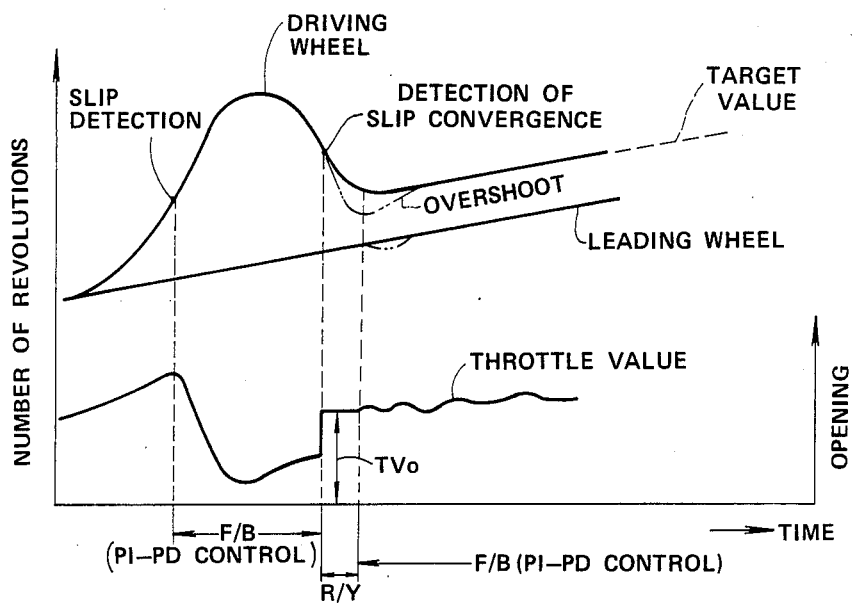
FIG. 20 is a graph illustrating the recovery control.
Figure 21:
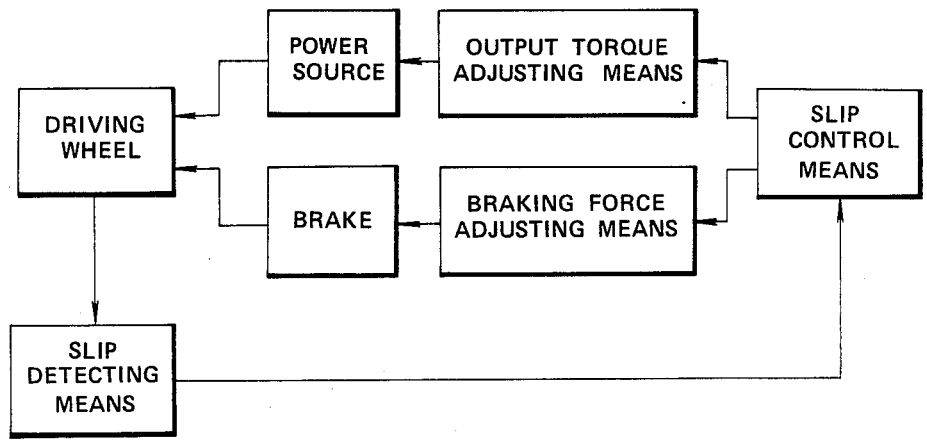
FIG. 21 is a schematic diagram showing the overall construction of the present invention.

(3) From $t_2$ to $t_4$ (recovery control):

During the course of a predetermined time (for example, 170 msec) after the reduction of the spinning ($S<0.2$), the throttle valve 13 is retained at a predetermined opening (open loop control). At the point of $S=0.2$ ($t_2$), the maximum acceleration $G_{MAX}$ is given, and the maximum road surface friction coefficient $\mu$ (the maximum grip force of the driving wheels) is estimated from the maximum acceleration $G_{MAX}$. The throttle valve 13 is retained for a predetermined period of time, as have been described above, so as to cause the driving wheels to produce the maximum grip forces. This control is carried out with the attempt to prevent the acceleration G of the vehicle body from being reduced immediately after the spinning reduced, that is, to prevent the overshoot from being occurred (as shown in FIG. 20), when a response of the feedback control is not in time because the rapid occurrence of the spinning reduction. If the reduction of the spinning is predicted, that is, when the slip ratio is decreased below $S=0.2$, a predetermined torque is secured in advance so as to improve the acceleration. The recovery control is particularly effective to avoid the excessive reduction in the slip ratio on account of a failure of the recovery control, leading to less acceleration or to avoid the re-occurrence of the spinning to a large extent by way of the excessive recovery control because the amount of the torques is increased in accordance with the occurrence of the spinning as shown in FIG. 15. It is noted herein that, although the maximum acceleration $G_{MAX}$ is the one obtained at the time of the commencement of the slip control, that is, at the time $t_1$ in FIG. 5, a maximum acceleration $G_{MAX}$ at the time when the spinning is being reduced as in this embodiment, that is, at the time $t_2$ in FIG. 5, is said to reflect a state of road surfaces more accurately if it is used as an amount of the torques increased by the recovery control.

The optimum throttle opening $T_{VO}$ for providing the driving wheels with torques capable of generating the maximum grip force can be theoretically given by a torque curve of the engine 6 and a transmission gear ratio. In this embodiment, however, said $T_{VO}$ is determined on the basis of a map, for example, as demonstrated in FIG. 15. The map is prepared in accordance with experimental procedures, in which $G_{MAX}$ is determined to become a constant value when it is equal to or lower than 0.15 or it is equal to or higher than 0.4 with measuring errors under consideration. It is to be noted here that, since the map indicated in FIG. 15 is prepared on the basis of a particular speed mode such as, for example, the first speed mode, a map for any other speed mode can be prepared by correcting the optimum throttle opening $T_{VO}$.

(4) From $t_4$ to $t_7$ (backup control and absorb control):

The backup control is designed to be conducted (open loop control) in order to cope with an unusual reduction in the slip ratio S. That is, when the slip ratio S become lower than $S=0.01$, the feedback control is stopped and the opening of the throttle valve 13 is caused to become larger in a stepwise manner.

When the slip ratio is between 0.01 and 0.02, that is, in the course of time from $t_4$ to $t_5$ and from $t_6$ to $t_7$, the absorb control is conducted so as to smoothly move to the next feedback control.

The backup control is conducted when neither the feedback control nor the recovery control can work effectively. The backup control to be used here is designed so as to allow a response time to become sufficiently faster than the feedback control.

A rate of the throttle opening in the backup control, in this embodiment, is designed so as to be increased for every 14 msec of the sampling time by 0.5% of the previous throttle opening.

Figure 16:
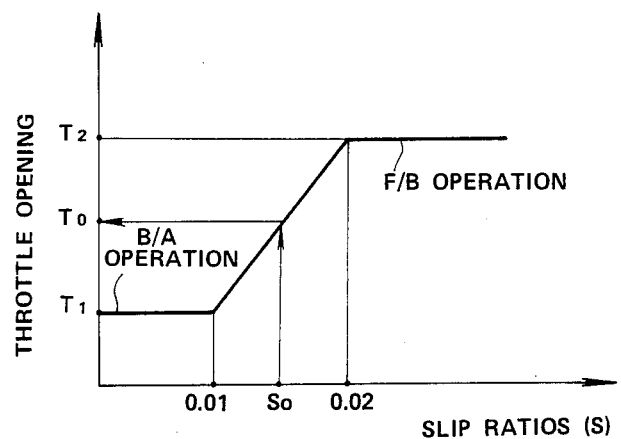
FIG. 16 is a graph showing the relationship of slip ratios for the absorb control with the throttle opening.

In the absorb control, as shown in FIG. 16, a throttle opening $T_0$ is determined by proportioning a throttle opening $T_1$ obtained by the operation of the backup control and a throttle opening $T_2$ obtained by the operation of the feedback control with the present slip ratio $S_O$.

(5) From $t_7$ to $t_8$:

By continuing the control conducted until the point $t_7$, the control is caused to be transferred smoothly into the slip control by the engine alone.

(6) $t_8$ et seq.

The slip control is suspended because the accelerator 69 is fully closed by the operator D. At this time, there is no risk of the re-occurrence of the spinning, even if the throttle opening of the throttle valve 13 is left in the discretion of the operator D, because the torques are caused to be decreased to a sufficient level. In this embodiment, the slip control is caused to be suspended, in addition to the full closure of the accelerator 69, when the target throttle opening by the slip control becomes smaller than the throttle opening determined by FIG. 12 corresponding to the accelerator opening to be operated by the operator D.

Figure 19:
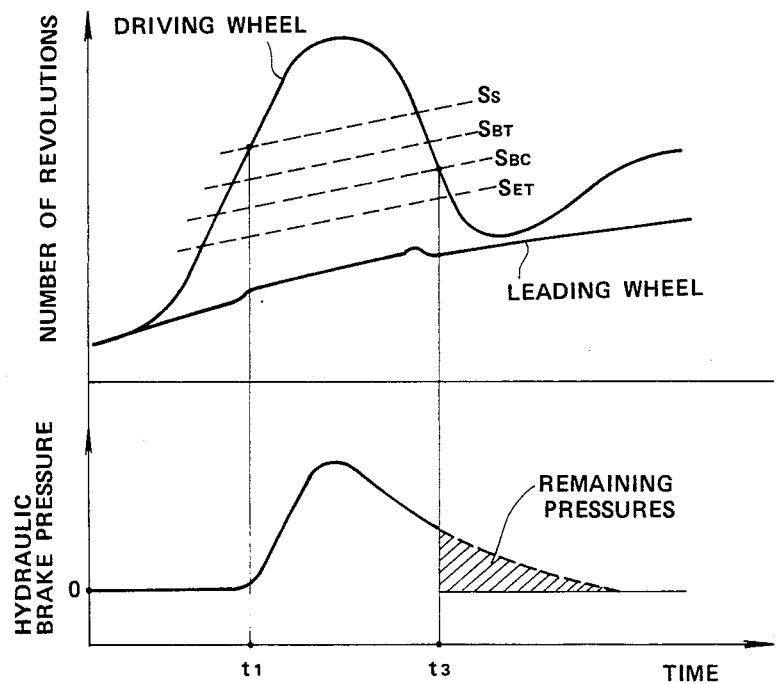
FIG. 19 is a graph illustrating a state of hydraulic brake pressures before or after the suspension of the slip control by the brake.

It is noted herein that, in the course of transferring from a state where the slip control is conducted by both the engine and the brake to a state where the slip control is conducted by the engine alone, the slip control by the brake is suspended at the point $t_3$, that is, at the point of the slip ratio being $S_{BC}$. Accordingly, the brake pressure is completely released and becomes zero after the point $t_3$, as indicated in FIG. 19, so that the slip control is allowed to be conducted by the engine alone without any remaining influence from the brake. It is further noted herein that the brake pressure is caused to be sufficiently low in the course of transferring into the slip control by the engine alone because the target slip control $S_{BT}$ for the brake is set to be larger than the target slip ratio $S_{ET}$ for the engine and the slip ratio $S_{BC}$ at the time of the brake release is set between the two target slip ratios, so that no spinning is likely to occur again at the time $t_3$ when the brake is released. Merely for reference, it is noted that, if there were not set the point $S_{BC}$ where the braking is suspended, brake pressures are caused to remain in a region represented in FIG. 19 by the oblique lines after the point $t_3$ and the braking is still working thereafter.

Detailed Description of Slip Control

In accordance with the present invention, the overall slip control system will be described below with reference to FIGS. 6 to 11, inclusive. In this embodiment, it should be noted that the control can be also made using the brake control to get free from the mud or the like—this control will be referred to herein as a so-called "stuck control". In the following description, reference symbol P denotes a step.

Figure 6A:
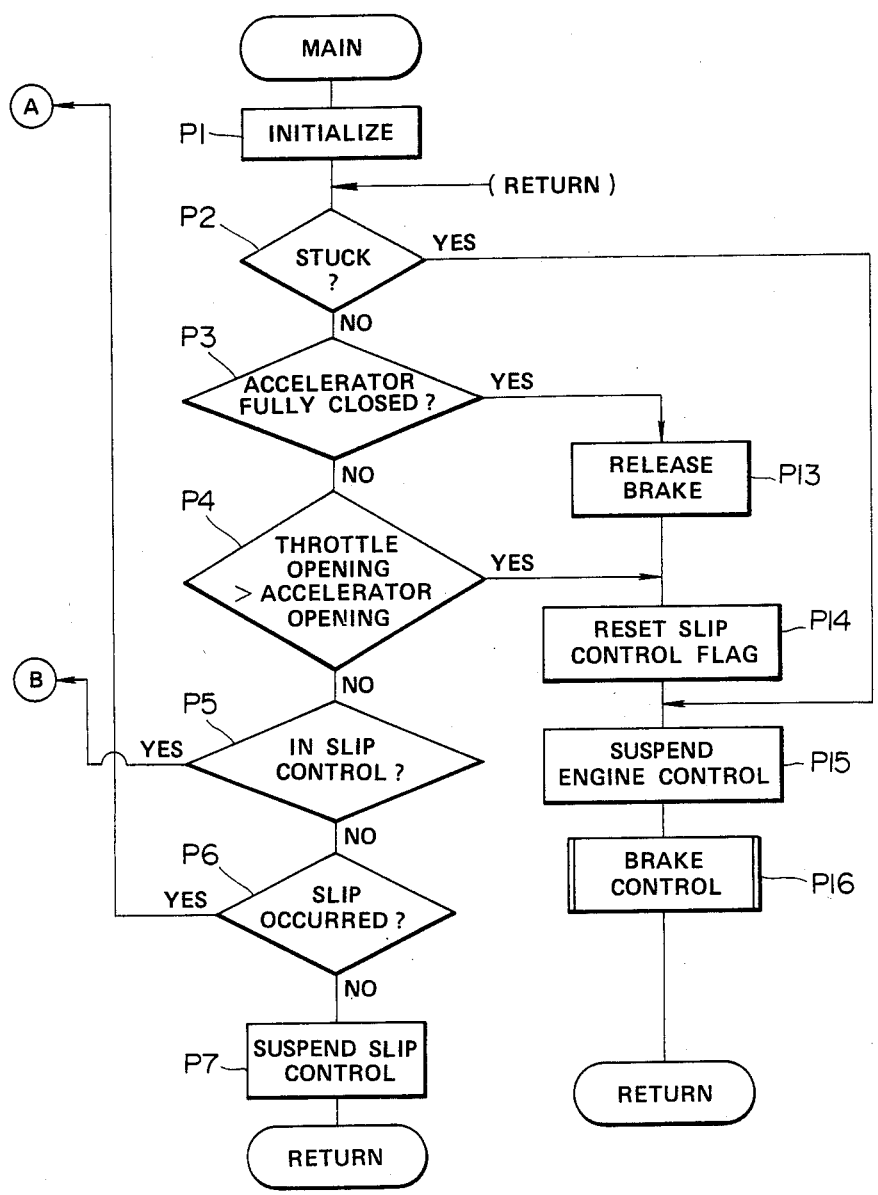
FIGS. 6 to 11 are each a flowchart illustrating a control example in accordance with the present invention.
Figure 6B:
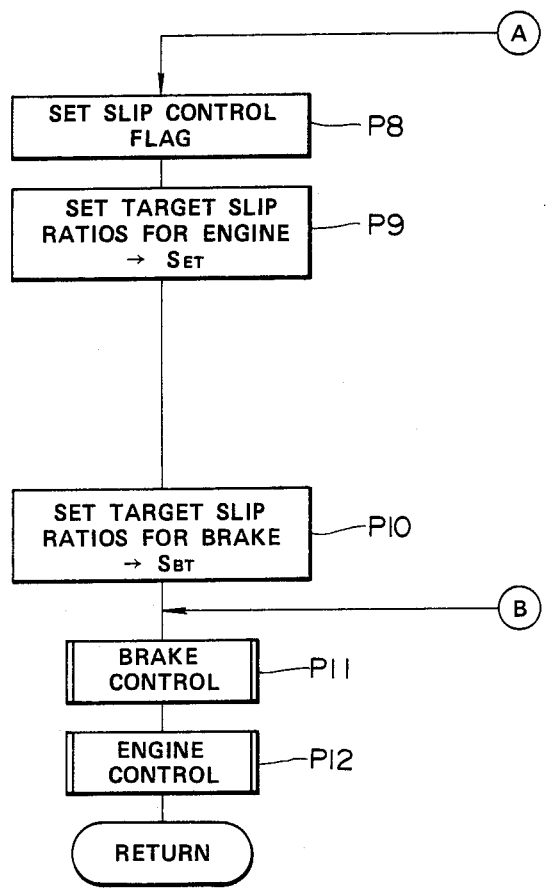

FIG. 6 (Main Routine)

In P1, the system is initialized, and it is discriminated in P2 whether or not a vehicle is in a stuck state or whether or not it is stuck in the mud and consequently in an unmovable state. This discrimination is made by seeing whether or not a stuck flag is set as will be described below. If NO in P2, the flow proceeds to P3 and it is then discriminated whether or not the accelerator 69 is completely closed. If NO in P3, it is then discriminated in P4 whether or not the present throttle opening is larger than the accelerator opening. If it is discriminated as NO in P4, the flow proceeds to P5 and it is then discriminated whether or not it is in the progress of the slip control. This discrimination is conducted by checking whether or not a slip control flag is set. If NO in P5, it is discriminated in P6 whether or not the slip or spinning would have occurred to a degree such that the slip control was required. This is discriminated by seeing whether a slip flag for the left front wheel 2 and the right front wheel 3 is set. If it is discriminated NO in P6, the flow proceeds to P7 and the slip control is suspended, leading to the normal driving.

If YES in P6, the flow proceeds to P8 where a slip control flag is set. Then, in P9, the initial value (S=0.06 as in this embodiment) of the target slip ratio $S_{ET}$ for the engine (throttle) is set and, in P10, the initial value (S=0.17 as in this embodiment) of the target slip ratio $S_{BT}$ for the brake is set. Thereafter, for the slip control, the brake control is effected in P11 and the engine control is done in P12, as will be described below. It is to be noted here that the determination of the initial values in both P9 and P10 is done on the basis of the maximum acceleration $G_{MAX}$ obtained by the previous slip control from the similar point of view as in P76 below.

In P5, if it is discriminated as YES, the flow proceeds to P11 and the slip control continues to be done.

If YES in P4, it is shown that no slip control is required and the flow advances to P14 where a slip control flag is reset. Then, the engine control is suspended in P15, and the brake control is conducted in P16. This brake control in P16 is done so as to cope with a state where a vehicle is stuck.

In P3, if it is discriminated YES, the flow proceeds to P13 where the brake is released and treatments are done in P14 and thereafter.

If YES in P2, the flow proceeds to P15 and the treatments following P15 are conducted.

Figure 7:
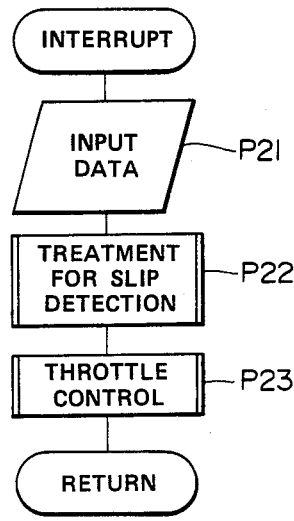

FIGS. 7 & 8:

The flowchart demonstrated in FIG. 7 is designed so as to interrupt into the main flowchart demonstrated in FIG. 6, for example, in every 14 msec.

In P21, signals from each of the sensors 61 to 68, inclusive, are input for data treatments. The flow then proceeds to P22 and the treatment of slip detection is conducted, and then, in P23, the throttle control is conducted.

Figure 8:
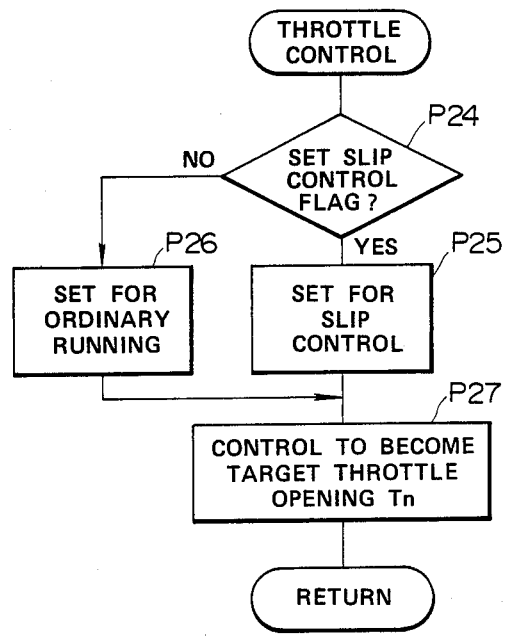

The throttle control in P23 is effected in accordance with a flowchart demonstrated in FIG. 8. In P24, it is discriminated whether or not a flag for the slip control is set, that is, whether or not the slip control is currently under way. If YES in P24, on the one hand, the throttle valve 13 is controlled so as to select the control mode capable of reaching the predetermined target slip ratio $S_{ET}$ for the slip control, that is, without following the peculiar character demonstrated in FIG. 12. If NO in P24, on the other, the flow proceeds to P26 and the opening or closing of the throttle valve 13 is regulated by the operator D in his discretion, leading to the peculiar character demonstrated in FIG. 2. Subsequent to P25 and P26, the control is carried out, in P27, to realize the target throttle opening, as will be described below, that is, the control following P68, P70 and P71 and the control following the character of FIG. 12 are conducted as will be described below.

Figure 9:
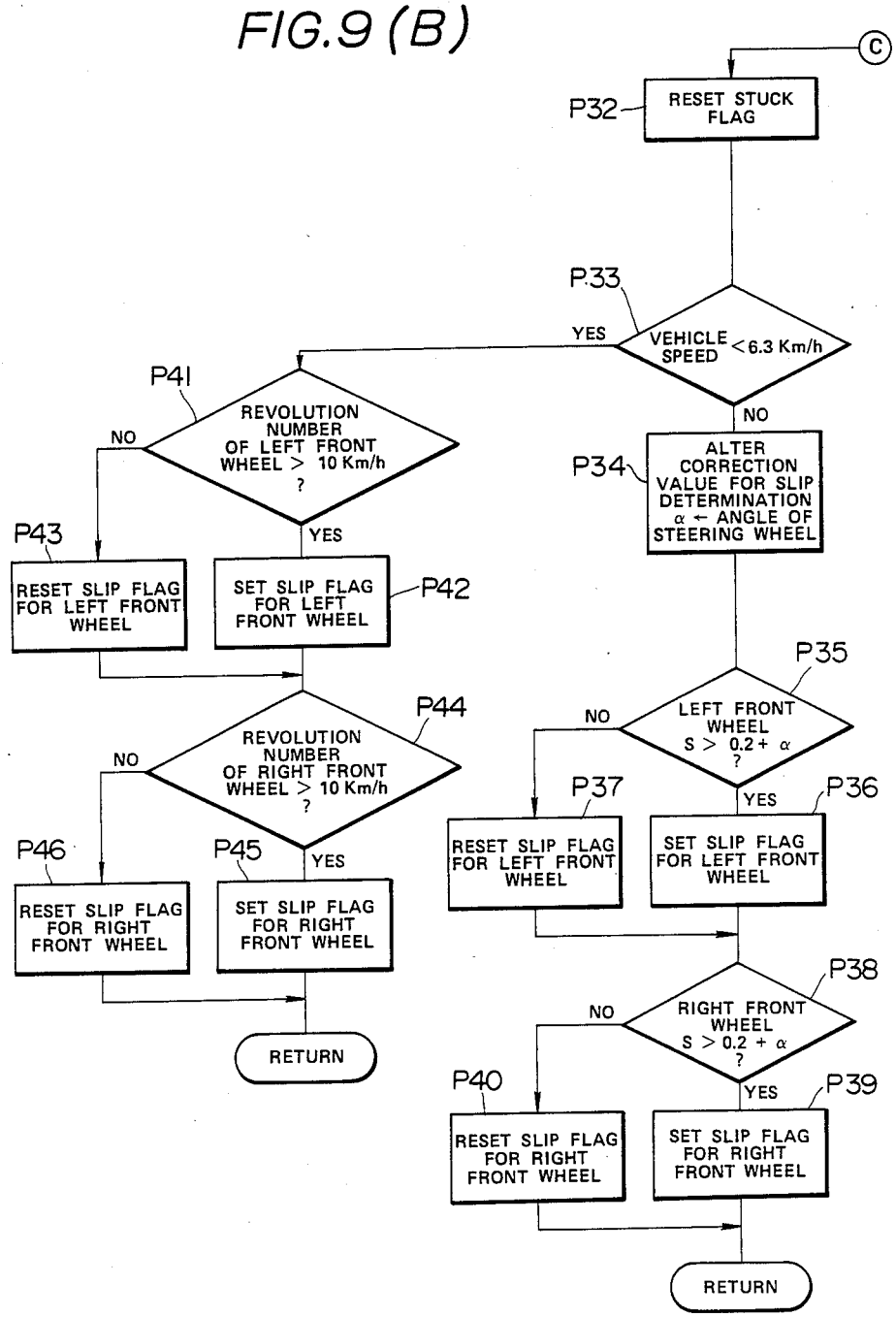

FIG. 9 (Slip Detection)

The flowchart of FIG. 9 corresponds to P22 of FIG. 7 and is to detect whether or not the slip or spinning subject to the slip control has occurred and is to detect whether or not a vehicle is stuck.

In P31, it is discriminated whether or not the clutch 7 is completely connected. If YES in P31, it is found that the vehicle is not stuck. Then, the flow proceeds to P32 where a Stuck Flag is reset and, in P33, it is discriminated whether or not the present vehicle speed is as slow as, for example, below 6.3 km/h.

Figure 14:
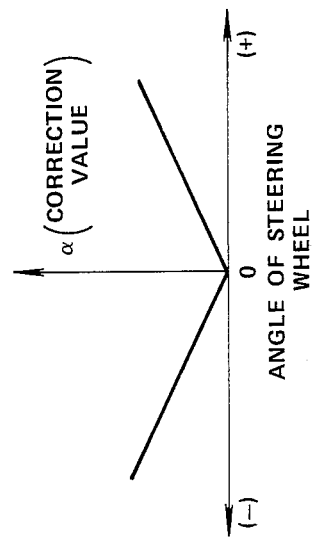
FIG. 14 is a graph showing correction values for correcting slip ratios at the commencement of the slip control in accordance with angles of the steering handle.

If NO in P33, the flow proceeds to P33 where a correction value $\alpha$ for the slip detection is computed in accordance with a steered angle of the steering wheel 70, as referred to in FIG. 14. Thereafter, in P35, it is discriminated whether or not a slip ratio for the left front wheel 2 as the lefthand driving wheel is larger than an addition of the above correction value $\alpha$ to the predetermined reference value of 0.2, that is, $0.2+\alpha$. If YES in P35, on the one hand, it is found that the left front wheel 2 is in a state of slippage so that a slip flag is set in P36. If NO in P35, the flow proceeds to P37 where a slip flag for the left front wheel 2 is reset. It is noted here that the correction value $\alpha$ is determined with a difference of revolutions between the inner and outer wheels at the time of the spinning, particularly a difference of revolutions between the driving wheel and the leading wheel.

Subsequent to P36 and P37, a slip ratio for the right front wheel 3 is discriminated in P38 in substantially the same manner as described above on the left front wheel 2. If YES in P38, a slip flag for the right front wheel 3 is set in P39 and, if NO in P38, a slip flag therefor is reset in P40.

When it is discriminated as YES in P33, the vehicle speed is so slow that the computation of the slip ratio based on the relationship (1) utilizing the vehicle speed is predicted to give high errors in measurement. Accordingly, in this case, a state of slippage is determined merely by the detection of the numbers of revolutions of the driving wheels. That is, in P41, it is discriminated whether or not the number of revolutions of the left front wheel 2 is larger than that corresponding to the vehicle speed of 10 km/h. If YES in P41, a slip flag for the left front wheel 2 is set in P42 and, if NO in P41, a slip flag for the left front wheel 2 is reset.

After P42 and P43, a slip flag for the right front wheel 3 is set or reset in P44, P45 and P46 in substantially the same manner as in P41 to P43.

In P31, if it is discriminated as NO, there is the possibility that the vehicle is stuck. In this case, an operator D will try to get the vehicle free from the stuck state, as in the mud, with the clutch connected halfway. At this moment, the flow moves to P51 where it is discriminated whether or not a difference of the revolution numbers between the left and right front wheels 2 and 3 as the driving wheels is small (is as large as, for example, 2 km/h, when the number of revolutions is translated into the vehicle speed). If NO in P51, it is discriminated in P52 whether or not the vehicle is currently in the progress of the stuck control. If NO in P52, it is discriminated in P53 whether or not the number of revolution of the right front wheel 3 is larger than the number of revolutions of the left front wheel 2. If YES in P53, it is discriminated in P54 whether or not the number of revolutions of the right front wheel 3 is larger than 1.5 times as much as the number of revolutions of the left front wheel 3. If YES in P54, on the one hand, a Stuck Flag is set in P56 and, if NO in P54, on the other hand, it is found that the vehicle is not stuck so that the treatments following P32, as described above, will be carried out.

If NO in P53, it is discriminated in P55 whether or not the number of revolutions of the left front wheel 2 is larger than 1.5 times as much as the number of revolutions of the right front wheel 3. If YES in P55, the flow proceeds to P56 and, if NO in P55, the flow proceeds to P32.

After P56, it is discriminated in P57 whether or not the vehicle speed is faster than 6.3 km/h. If YES in P57, it is set in P58 such that the numbers of revolutions of the front wheels 2 and 3 become 1.25 times as much as the numbers of revolutions of the respective leading wheels representing the vehicle speed equivalent to the slip ratio $S=0.2$. If NO in P57, the target numbers of revolutions of the front wheels 2 and 3 are set to be equivalent each to the vehicle speed of 10 km/h in P59.

If YES in P51, the brake is released gradually in P60. If YES in P52, the flow proceeds directly to P56 without any treatment in P53, P54 and P55.

Figure 10:
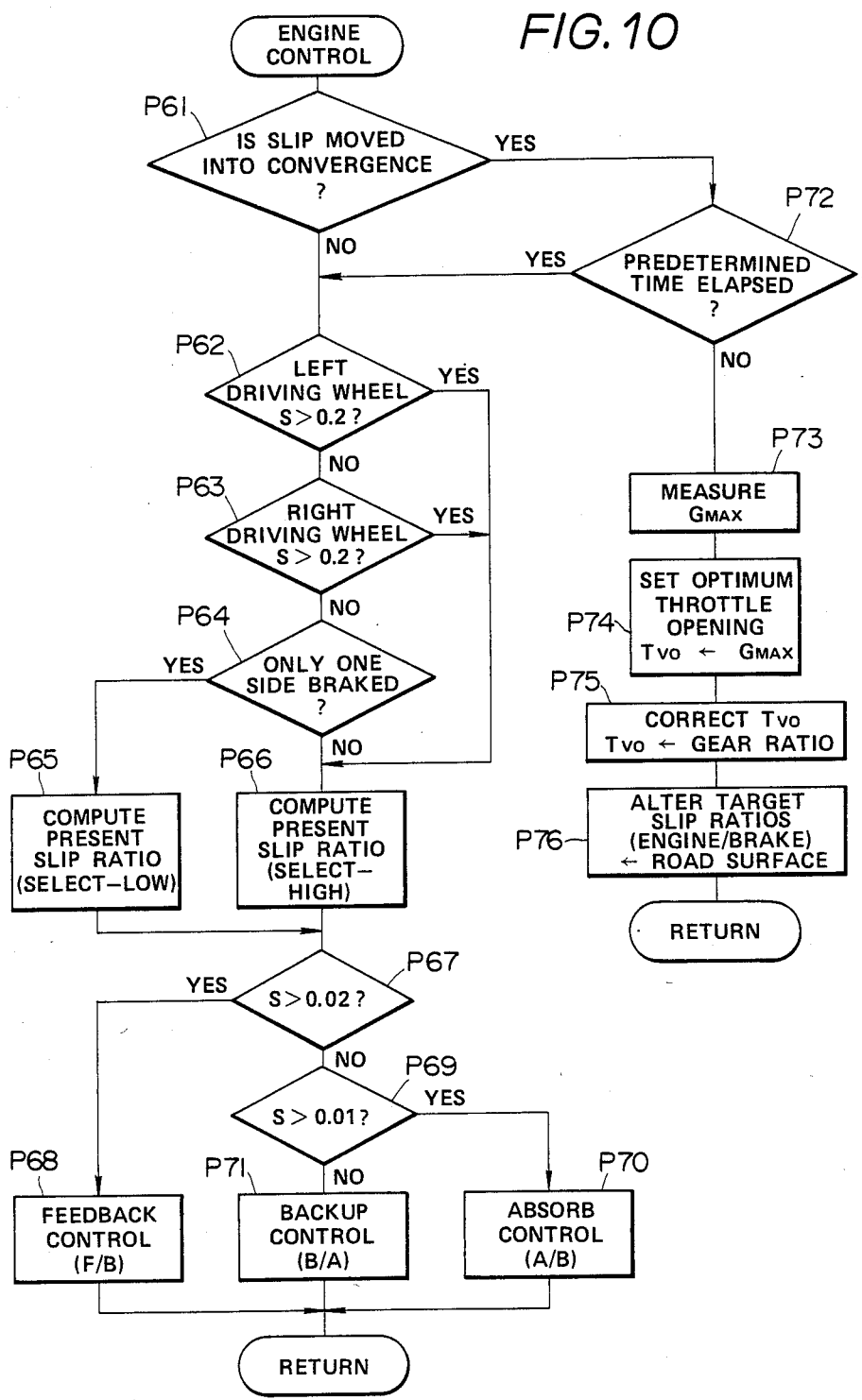

FIG. 10 (Engine Control)

The flowchart of FIG. 10 corresponds to P12 of FIG. 6.

In P61, it is discriminated whether or not a state of the slip is moved into a reducing state, or whether the point $t_2$ of FIG. 5 is passed. If NO in P61, it is discriminated in P62 whether or not the slip ratio of the left front wheel 2 is larger than $S=0.2$. If NO in P62, it is discriminated in P63 whether or not the slip ratio of the right front wheel 3 is larger than $S=0.2$. If NO in P63, it is discriminated in P64 whether or not only one of the left and right front wheels 2 and 3 is under the brake control, viz., whether or not the vehicle is running on a split road. If YES in P64, on the one hand, the flow proceeds to P65 and the present slip ratio is set to the driving wheel with the lower slip ratio (select-low). If NO in P64, on the other hand, the flow proceeds to P66 and the present slip ratio is set to the driving wheel with the higher slip ratio (select-high). If YES in P62 and in P63, the flow proceeds to P66 in each case.

The select-high step in P66 is to enable the frequency of the braking to be lessened more by computing the present slip ratio in such a way that the slip or spinning of the driving wheel that is likely to slip more than the other driving wheel is controlled. The select-low step in P65 is to enable the slip or spinning of the driving wheel likely to slip more than the other to be controlled by the brake and, at the same time, to enable the vehicle to be driven using the grip force produced by the driving wheel that is less slippery, when the vehicle is running on a road such as a split road having different friction coefficients on road surfaces with which the left and right driving wheels are in contact. In the select-low step, it is preferred to limit its use, for example, to a particular period of time in order to avoid the excessive use of the brake or to provide backup means for suspending the select-low step in the event of the brake being overheated.

After P65 or P66, it is discriminated in P67 whether or not the present slip ratio is larger then $S=0.02$. If YES in P67, the throttle valve 13 is regulated for the slip control by way of the feedback control in P68. In this case, the target throttle opening Tn of the throttle valve 13 is set to become the target slip ratio $S_{ET}$ set in P9 or altered in P76 as will be described below.

If NO in P67, it is discriminated in P69 whether or not the present slip ratio is larger than $S=0.01$. If YES in P69, the flow proceeds to P70 and the absorb control is made as have been described above. If NO in P69, the backup control is done in P71, as have been described above.

If YES in P61, the flow proceeds to P72 where it is discriminated whether or not a predetermined period of time has passed after the slip reduced, viz., whether or not a period of time for the recovery control has passed—170 msec in this embodiment. If NO in P72, the treatments following P73 are carried out to effect the recovery control. That is, in P73, the maximum acceleration $G_{MAX}$ of the automobile 1 is measured at the point $t_2$ of FIG. 5 and, in P74, the optimum throttle opening $T_{VO}$ capable of obtaining the maximum acceleration $G_{MAX}$ is set as shown in FIG. 15. Then, in P75, the optimum throttle opening $T_{VO}$ obtained in P74 is corrected in accordance with the present speed mode of the transmission 8. Since the torques applied to the driving wheels vary with the speed mode, it is noted in this embodiment that the optimum throttle opening $T_{VO}$ is set in P74 for a reference speed mode and then in P75, the difference of the speed mode is corrected. Thereafter, in P76, the target slip ratio $S_{ET}$ for the slip control by the engine (throttle) and the target slip ratio $S_{BT}$ for the slip control by the brake are altered by estimating a road surface friction coefficient from the maximum acceleration $G_{MAX}$ obtained in P73. Alteration of the target slip ratios $S_{ET}$ and $S_{BT}$ will be described below.

If YES in P72, it is found that the recovery control is finished so that the flow proceeds to P62 for the further treatments as have been described.

Figure 11:
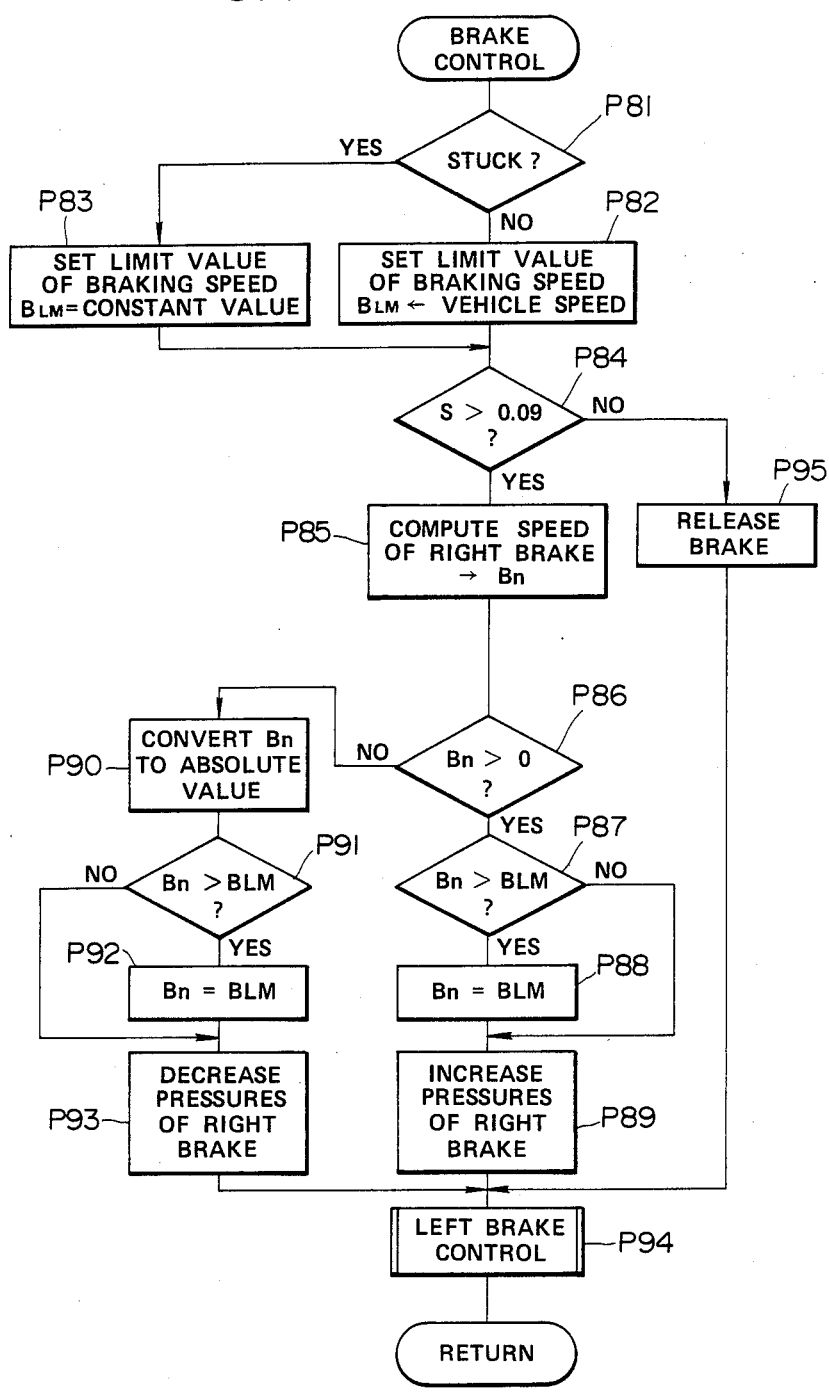

FIG. 11 (Brake Control)

The flowchart of FIG. 11 corresponds to P11 and P12 of FIG. 6.

It is discriminated in P81 whether or not the vehicle is stuck in the mud or the like. If NO in P81, the flow advances to P82 and the limit value (maximum value) $B_{LM}$ of a response speed Bn of the brake equivalent to the duty ratio for the opening or closing control of the valves SV1 to SV4 is set as a function variable in accordance with a vehicle speed—a function becoming larger as the vehicle speed gets faster. If YES in P81, the limit value $B_{LM}$ is set in P83 to be a constant value smaller than the limit value $B_{LM}$ of P82. The treatments in P82 and P83 are arranged with the attempt unlikely to cause any vibration to occur on account of a speed of an increase or decrease in the brake pressure becoming too fast if the brake response speed Bn computed by the relationship (5) above is used as it is. In addition, it is particularly undesirable to cause the braking force on the driving wheels to vary rapidly in order to get the vehicle free from the stuck state so that the limit value $B_{LM}$ in P83 is set smaller than that in P82.

After P82 or P83, it is discriminated in P84 whether or not the slip ratio is larger than S=0.09 that is the point of the brake control being suspended. If YES in P84, an operation speed Bn of the brake 22 for the right front wheel is computed in P85, which is equivalent to Bn in the I-PD control of FIG. 4. Thereafter, in P86, it is discriminated whether or not the operation speed Bn is larger than zero. This discrimination is to see whether or not the brake pressure is in the increasing direction by setting the direction of increasing the brake pressure to a positive value, viz., larger than zero, and the direction of decreasing the brake pressure to zero or a negative value smaller than zero. If YES in P86, it is discriminated in P87 whether or not Bn is larger than $B_{LM}$. If YES in P86, on the one hand, Bn is set to the limit value $B_{LM}$ in P88 and then in P89, the brake pressure of the right brake 22 is increased. If NO in P87, the flow proceeds to P89 and the brake pressure thereof is increased in accordance with $B_n$ set in P85.

When NO at P86, it is found that Bn is a negative value or zero so that Bn is converted in P90 to the corresponding absolute value followed by the treatments in P91 to P93, inclusive. The treatments in P91 to P93 are carried out to decrease the brake pressure of the right brake 22 as in substantially the same manner as those in P87 to P89, inclusive.

If NO in P84, the flow proceeds to P95 and the brake control is suspended by the release of the brake.

After P89, P93 or P95, the flow proceeds to P94 where the brake pressure of the left brake 21 is increased or decreased in substantially the same manner as that of the right brake 22 is treated in P84 to P93, P95 inclusive.

It is noted herein that, if the difference between the actual revolution numbers and the target revolution numbers (an actual slip ratio and the target slip ratio) is large, the correction of the integral coefficient KI in the above relationship (5), for example, is preferable in order to prevent the acceleration from being impaired by the excessive use of the brake and the engine from being stalled. This correction may be done by said KI is caused to become smaller in a step between P85 and P86.

Alteration of Target Slip Ratios $S_{ET}$ and $S_{BT}$ (P76)

Figure 17:
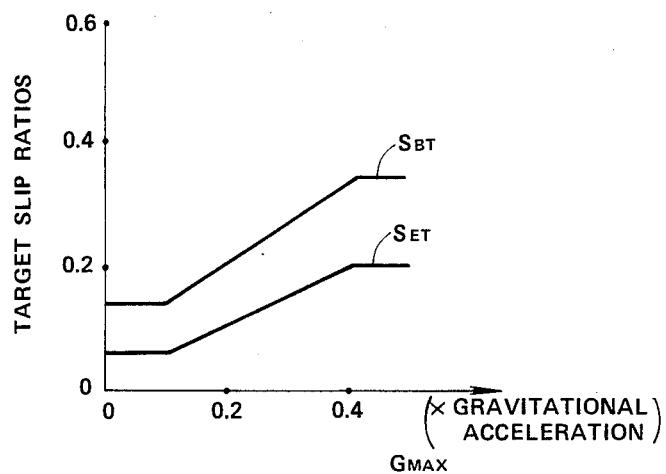
FIG. 17 is a table illustrating an example of a map for determining a target slip ratio.

In P76, the target slip ratio $S_{ET}$ for the engine and $S_{BT}$ for the brake to be altered, as demonstrated in FIG. 17, on the basis of the maximum acceleration $G_{MAX}$ measured in P73. As apparent from FIG. 17, the slip ratios $S_{ET}$ and $S_{BT}$, as a rule, get larger as the maximum acceleration $G_{MAX}$ gets larger, and each of the limit value therefor is set.

Notwithstanding the alteration of the target slip ratios $S_{ET}$ and $S_{BT}$, if a slip ratio $S_{BC}$ is set at the point of suspension of the slip control by the brake as an intermediate value between $S_{ET}$ and $S_{BT}$, the intermediate value $S_{BC}$ is not required, as a rule, to be altered. However, for example, if the intermediate value $S_{BC}$ is positioned in a constant distance at a position closer to the target slip ratio $S_{ET}$ by 20% of a deviation value of the target slip ratios $S_{ET}$ and $S_{BT}$, the intermediate value $S_{BC}$ may be altered pursuant to the alterations of the target slip ratios $S_{ET}$ and $S_{BT}$.

The following is a description on an influence of the determination of the target slip ratios $S_{ET}$ and $S_{BT}$ on the driving of the automobile 1.

(1) Grip Forces of Driving Wheels

The target slip ratios $S_{ET}$ and $S_{BT}$ are offset as a whole in the upward or downward direction of FIG. 17. In order to make the grip force greater, they are offset in the upward direction. This can be said true as long as the slip ratio in the range of 0.2 to 0.3 or below is used because the road surface friction coefficient $\mu$ is in the increasing direction up to the slip ratio being 0.2 to 0.3 as the peculiar character of spike tires, as shown in FIG. 13.

(2) Acceleration Feelings

The acceleration feeling varies with a difference between the target slip ratios $S_{ET}$ and $S_{BT}$. Acceleration is felt greater as the difference therebetween gets smaller. As in this embodiment, in instances where the target slip ratio $S_{ET}$ for the engine is set smaller than the target slip ratio $S_{BT}$ for the brake, the brake control mainly works when the slip ratio of the driving wheel is larger and the engine control mainly works when the slip ratio of the driving wheel is smaller. Accordingly, if the difference between the target slip ratios $S_{ET}$ and $S_{BT}$ is small, the engine control and the brake control work in a direction equally proportional to each other. That is, in this case, the driving wheels are driven in a state that the torques generated by the engine are reduced by the brake so that the torques to be transmitted to the driving wheels are caused to be increased without a delay in a response merely by releasing the brake when the torques are required to be increased rapidly for acceleration.

(3) Smoothness in Acceleration

A smoothness in acceleration can be attained when the target slip ratio $S_{BT}$ for the brake gets large, viz., relatively large as compared to the target slip ratio $S_{ET}$ for the engine. In this case, the engine control is caused to prevail over the brake control, thereby leading to the effective occurrence of a smooth variation in torques, which is the advantage of the engine control.

(4) Cornering Stability

A stability during the cornering can be obtained when the target slip ratio $S_{ET}$ for the engine gets small, viz., relatively small compared to the target slip ratio $S_{BT}$ for the brake. As will be apparent from FIG. 13, in the region from S=0.2 to S=0.3 or below, where the maximum grip force is created, the reduction in the target slip ratio can make the grip forces of the driving wheels smaller and, at the same time, make the transverse force as large as possible.

The characteristic modes as represented by (1) to (4) above, may be selected automatically or manually by the operator D (mode selection).

In the embodiments described above, the target slip ratio $S_{BT}$ for the brake is set larger than the target slip ratio $S_{ET}$ for the engine so that no brake control is carried out when a degree of the slip or spinning is small, leading to a less frequency of uses of the brake, and that a burden of the brake control is lessened even when a large slip or spinning occurs. In addition, since there is set the intermediate point ($S_{BC}$) between the target slip ratios $S_{BT}$ and $S_{ET}$, where the slip control by the brake is suspended, the brake pressure is caused to be decreased to a sufficient degree at the time of the suspension of the brake control so that a rapid variation in torques is caused unlikely to occur.

Figure 18:
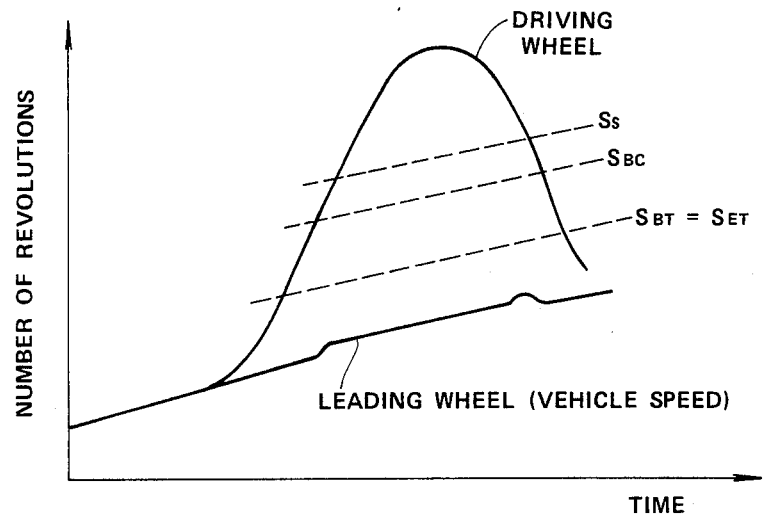
FIG. 18 is a graph illustrating another embodiment of the control according to the present invention, corresponding to FIG. 5.

Another embodiment (FIG. 18)

FIG. 18 illustrates another embodiment in accordance with the present invention. In this embodiment, the target slip ratio $S_{ET}$ for the engine is set to be equal to the target slip ratio $S_{BT}$ for the brake, and the slip ratio $S_{BC}$ at the time of the suspension of the brake control is set to be larger than the target slip ratios $S_{ET}$ and $S_{BT}$. Although this embodiment can simplify the way of control, the brake pressure at the time of the suspension of the brake control may be occasionally in a very high state.

In accordance with the present invention, the embodiments have been described, but it should be understood that the present invention is by no means construed to be limited to the embodiments above and any changes or modifications as will be described below should be encompassed within the scope of the present invention.

a. For the simplification of the control, the target slip ratio for the brake control may be set so as to be identical to the target slip ratio for the engine control, and the brake control may be designed to be conducted for a constant period of time after the commencement of the slip control, namely, after $t_1$ in FIG. 5.

It is also possible that the target slip ratio for the brake control is set to be identical to the target slip ratio for the engine control and the brake control is carried out only when the slip or spinning of the driving wheels is being increased. That is, the brake control may be conducted when a variant of the revolution numbers of the driven wheels, $dW_D/dt$, is positive or when a variant of the slip ratios, $dS/dt$, is positive.

b. Means for adjusting the torque generated by the engine 6 may be preferably of the type regulation a factor that exert the most influence upon the engine output. That is, it is preferred that the torque output is adjusted by a so-called load control. It is preferable to adjust an amount of a mixture fuel in the otto-type engine such as, for example, a gasoline engine, and to adjust an amount of a fuel injection in a diesel engine.

In addition to the load control, the ignition timing may be adjusted in the Otto-type engine, and the timing of the fuel injection may be adjusted in the diesel engine. In a supercharged engine, a supercharged pressure may be adjusted. Of course, a power source may include, in addition to an internal combustion engine, an electric motor. In this case, the output torque may be adjusted by the adjustment of an electric power to be supplied to the motor. It is also preferred that, for the adjustment of the output torque in the power-plant system, a state of connection of the clutch 7 or a transmission gear ratio of the transmission 8 as well as the engine may be adjusted. In this case, a continuationaly variable transmission (CVT) is particularly preferred.

c. The automobile 1 may include, in addition to the one with the front wheels 2 and 3 as the driving wheels, the ones with the rear wheels 4 and 5 as the driving wheels and with all the four wheels as the driving wheels.

d. In order to detect a state of the slip or spinning of the driving wheels, it may be detected directly from the revolution numbers of the driving wheels as in this embodiment above and indirectly by predicting a state of the slip or spinning thereof from a state of the vehicle. Such a state of the vehicle may include, for example, an increase in the output torque of a power source or in the number of revolutions, a variation in the accelerator opening, a variation in the revolution of the driving shaft, a state of steering wheels (cornering), a state of the vehicle body lifted (acceleration), and a loadage. In addition to these factors, a road surface friction coefficient $\mu$ upon a magnitude of atmospheric temperatures, a rainfall, a snowfall or on an iced road may be detected automatically or input manually to predict a state of the slip or spinning of the driving wheels more adequately.

e. The brake to be used for the slip control may be of the electromagnetic type as well as of the hydraulic type.

f. In order to detect a state of the slip being reduced, a ratio of the slip ratios, $dS/dt$, may be used.

g. As a state of the slip occurrence of the driving wheels to be used for determining an amount of the torque increased by the recovery control may be used, in addition to the maximum acceleration $G_{MAX}$, for exampel, a rotary acceleration of the driving wheels, a magnitude of the slip ratios of the driving wheels and a period of the slip continuance of the driving wheels.

h. The hydraulic brake pressure regulating circuit in FIG. 2 and the sensors 64, 65 and 66 may be composed of a known ABS (anti-brake lock system).

It is to be understood that the foregoing text and drawings relate to embodiments of the present invention given by way of examples but not limitation. Various other embodiments and variants are possible within the spirit and scope of the present invention.

What is claimed is:

1. In a vehicle slip control apparatus capable of preventing the driving wheel from being slipped or spinned excessively on a road surface by controlling a torque transmitted to the driving wheel, the slip control apparatus comprising:

output torque adjusting means for adjusting the output torque of a power source functioning as a source of the output of the torque;

braking force adjusting means for adjusting a braking force of the brake for a driving wheel;

slip detecting means for detecting slippage of the driving wheel on a road surface; and slip controlling means for carrying out the slip control by controlling said output torque adjusting means and said braking force adjusting means in response to an output from said slip detecting means, thereby reducing the output torque of said power source without using a braking force of the driving wheel when the degree of slippage of the driving wheel is small, and thereby providing the driving wheel with the braking force, in addition to the reduction in the output torque of the power source, when the degree of slippage of the driving wheel is large.

2. The slip control apparatus according to claim 1, wherein said slip controlling means comprises slip controlling means for a power source for controlling said output torque adjusting means in response to an output from said slip detecting means so as to cause the degree of slippage of the driving wheel to become a first target value; and slip controlling means for a brake for controlling said braking force adjusting means in response to an output from said slip detecting means so as to cause the degree of slippage of the driving wheel to become a second target value larger than said first target value.

3. The slip control apparatus according to claim 2, further comprising slip state detecting means for detecting a state of the slip or spinning on a road surface; and target value altering means for altering said first and second target values in response to an output from said slip state detecting means in accordance with the state of the slip or spinning on the road surface.

4. The slip control apparatus according to claim 3, wherein said slip state detecting means detects the maximum acceleration of the vehicle body when the slippage of the driving wheel is being reduced.

5. The slip control apparatus according to claim 1, wherein said slip controlling means comprises power source slip controlling means for conducting the slip control to cause the degree of slippage of the driving wheel to reach a first target value by controlling said output torque adjusting means in response to said slip detecting means;

brake slip controlling means for conducting the slip control to cause the degree of slippage of the driving wheel to reach a second target value by controlling said braking force adjusting means in response to an output from said slip detecting means; and brake releasing means for releasing the slip control by way of said slip controlling means for the brake when the slip or spinning of the driving wheel gives a predetermined value smaller than said second target value.

6. The slip control apparatus according to claim 5, wherein said first target value is set to be smaller than said second target value; and said predetermined value is set to be a value between said first and second target values.

7. The slip control apparatus according to claim 1, wherein said slip detecting means computes a slip ratio of the driving wheel on the basis of at least the number of revolutions of the driving wheel; and said slip controlling means is provided with slip controlling means for a power source for controlling the number of revolutions of the driving wheel by way of the feedback control so as to cause a slip ratio of the driving wheel to reach a predetermined value by controlling said output torque adjusting means in response to an output from said slip detecting means.

8. The slip control apparatus according to claim 1, wherein said slip detecting means computes a slip ratio of the driving wheel on the basis of at least the number of revolutions of the driving wheel; and said slip controlling means is provided with slip controlling means for a brake for controlling the number of revolutions of the driving wheel by way of a feedback control so as to cause a slip ratio of the driving wheel to reach a predetermined value by controlling said braking force adjusting means in response to an output from said slip detecting means.

9. The slip control apparatus according to claim 1, further comprising limiting means for limiting an operation speed of the brake so as not to exceed a predetermined maximum value.

10. The slip control apparatus according to claim 9, further comprising maximum value altering means for altering said predetermined maximum value so as to get larger as a vehicle speed gets larger.

11. In a vehicle slip control apparatus designed to prevent the driving wheel from being slipped or spinned excessively on a road surface by controlling the output of a torque to be transmitted to the driving wheel from a power-plant system including at least an engine, said slip control comprising:

torque adjusting means for adjusting the output of the torque of said power-plant system;

slip detecting means for detecting slippage of the driving wheel on a road surface;

feedback control means for controlling said torque adjusting means by way of the feedback control in response to a signal from said slip detecting means so as to cause the degree of slippage of the driving wheel to reach a target value;

slip reduction detecting means for detecting the reduction of the degree of slippage of the driving wheel from a large amount to said target value; and recovery control means for controlling said torque adjusting means, by way of an open loop control, by increasing said output torque in response to a signal from said slip reduction detecting means, in place of said feedback control, before the degree of slippage of the driving wheel reaches a target value, when the slippage of the driving wheel is being reduced from a large amount to said target value.

12. The slip control apparatus according to claim 4, further comprising slip occurrence detecting means for detecting occurrence of slippage of the driving wheel; and increased-torque amount altering means for altering an increased amount of the output torque by said recovery control means in accordance with the occurrence of slippage of the driving wheel in response to an output from said slip occurrence detecting means.

13. The slip control apparatus according to claim 12, wherein said slip occurrence detecting means detects the maximum acceleration of the vehicle body when the slippage of the driving wheel is being reduced; and said increased-torque amount altering means alters the increased amount of the torque to a greater degree, as said maximum acceleration of the vehicle body increases.

14. The slip control apparatus according to claim 11, wherein a power source of said power-plant system is an internal combustion engine in which the output torque is adjusted by adjusting an amount of intake air amount; and said torque adjusting means is to adjust the amount of intake air amount of said internal combustion engine.

15. The slip control apparatus according to claim 11, further comprising backup control means for controlling said torque adjusting means by way of an open loop control so as to cause the output torque to become gradually larger when the degree of slippage of the driving wheel becomes smaller than a value set for the backup control determined as a value smaller than said predetermined target value.

16. The slip control apparatus according to claim 15, further comprising absorb control means for smoothly conducting the transfer between said backup control and said feedback control by way of an open loop control.

17. The slip control apparatus according to claim 16, wherein said absorb control means is set so as to control said torque adjusting means by a magnitude intermediate between a value obtained by said backupt control means and a value obtained by said feedback control means.

18. In a vehicle slip control apparatus designed to prevent the driving wheel from being slipped or spinned excessively on a road surface by controlling a torque transmitted to the driving wheel, said slip control apparatus comprising:

output torque adjusting means for adjusting the output of a torque of a power source functioning as a source of the output of the torque;

braking force adjusting means for adjusting a braking force of a brake for the driving wheel;

slip detecting means for detecting slippage of the driving wheel on a road surface;

power source slip controlling means for controlling said output torque adjusting means by way of a feedback control in response to an output from said slip detecting means so as to cause the degree of slippage of the driving wheel to become a first target value;

brake slip controlling means for controlling said braking force adjusting means in response to an output from said slip detecting means so as to cause the degree of slippage of the driving wheel to become a second target value larger than said first target value;

slip reduction detecting means for detecting the reduction in the degree of slippage of the driving wheel from a large amount thereof to each of said target value; and recovery control means for controlling said torque adjusting means, by way of an open loop control, by increasing said output torque in response to an output from said slip reduction detecting means before the degree of slippage of the driving wheel reaches at least said first target value, when the slippage of the driving wheel is being reduced from a large amount to each of said target values.

19. In a vehicle slip control apparatus designed to prevent the driving wheel from being slipped or spinned excessively on a road surface by controlling a torque transmitted to the driving wheel, said slip control apparatus comprising:

left slip detecting means for detecting slippage of the left driving wheel on a road surface;

right slip detecting means for detecting slippage of the right driving wheel on a road surface;

selecting means for selecting either the magnitude of slippage from said left slip detecting means or the magnitude of slippage from said right slip detecting means on the basis of a predetermined condition;

left braking force adjusting means for adjusting a braking force against the left driving wheel;

right braking force adjusting means for adjusting a braking force against the right driving wheel;

a power source to be used in common for the left and right driving wheels;

output torque adjusting means for adjusting the output of a torque of said power source;

engine slip controlling means for controlling said output torque adjusting means in response to an output from said selecting means so as to cause the degree of slippage of the driving wheel selected by the selecting means to become a first target value by controlling said torque adjusting means;

left brake slip controlling means for controlling said left braking force adjusting means in response to an output from said left slip detecting means sos as to cause the degree of slippage of the left driving wheel to become a second target value larger than said first target value; and right brake slip controlling means for controlling said right braking force adjusting means in response to an output from said right slip detecting means so as to cause the degree of slippage of the right driving wheel to become said second target value.

20. The slip control apparatus according to claim 19, wherein said selecting means is set so as to select a smaller amount of slippage in the case when only either one of said slip controlling means for the left and right brakes operates and to select a larger amount of slippage in cases other than the above case.

* * * * *